United States Patent
Rose

[19]

[11] Patent Number: 5,971,571
[45] Date of Patent: Oct. 26, 1999

[54] CONCAVE LIGHT REFLECTOR DEVICE

[75] Inventor: Floyd H. Rose, Winona, Minn.

[73] Assignee: Winona Lighting Studio, Inc., Winona, Minn.

[21] Appl. No.: 08/925,893

[22] Filed: Sep. 8, 1997

[51] Int. Cl.$^6$ .................................. F21V 7/00; G02B 5/10
[52] U.S. Cl. .......................... 362/346; 362/298; 362/347; 359/853; 359/867; 359/868
[58] Field of Search .................................. 359/868, 853, 359/867, 869; 362/298, 346, 347

[56] References Cited

U.S. PATENT DOCUMENTS

| | | | |
|---|---|---|---|
| 3,251,984 | 5/1966 | Colterjohn | 362/346 |
| 3,679,893 | 7/1972 | Shemitz et al. | 240/103 |
| 3,983,039 | 9/1976 | Eastland | 250/492 |
| 4,006,355 | 2/1977 | Shemitz et al. | 240/51.11 |
| 4,027,151 | 5/1977 | Barthel | 240/41.35 |
| 4,041,306 | 8/1977 | Compton et al. | 240/103 |
| 4,078,169 | 3/1978 | Armstrong | 362/122 |
| 4,173,034 | 10/1979 | Shemitz | 362/98 |
| 4,218,727 | 8/1980 | Shemitz et al. | 362/297 |
| 4,229,779 | 10/1980 | Bilson et al. | 362/217 |
| 4,242,725 | 12/1980 | Douma et al. | 362/341 |
| 4,298,916 | 11/1981 | Shemitz | 362/127 |
| 4,308,573 | 12/1981 | McNamara, Jr. | 362/297 |
| 4,351,475 | 9/1982 | Hudson | 237/46 |
| 4,379,322 | 4/1983 | Kelly | 362/300 |
| 4,504,894 | 3/1985 | Reibling | 362/296 |
| 4,947,292 | 8/1990 | Vlah | 362/346 |
| 5,032,958 | 7/1991 | Harwood | 362/217 |
| 5,075,827 | 12/1991 | Smith | 362/221 |
| 5,278,737 | 1/1994 | Luce et al. | 362/147 |
| 5,530,628 | 6/1996 | Ngai | 362/33 |

*Primary Examiner*—Cassandra Spyrou
*Assistant Examiner*—Jennifer Winstedt
*Attorney, Agent, or Firm*—Kinney & Lange, P.A.

[57] ABSTRACT

A concave light reflecting device for providing substantially uniform illumination across a plane comprising a parabolic reflecting surface, an involute reflecting surface, and a segmented reflecting surface. The parabolic reflecting surface having a first end and a second end, wherein the parabolic radius of the first end is less than the parabolic radius of the second end. The involute reflecting surface having a first end, a second end, and a focal point within the concave portion of the device. Wherein, the distance from the focal point to the involute reflecting surface increases from the first end to the second end. The second end of the involute reflecting surface transitions to the first end of the parabolic reflecting surface, and the first end of the involute reflecting surface is connected to the segmented reflecting surface. The segmented reflecting surface extends outward from the focal point of the involute reflecting surface for decreasing glare from the device.

13 Claims, 5 Drawing Sheets

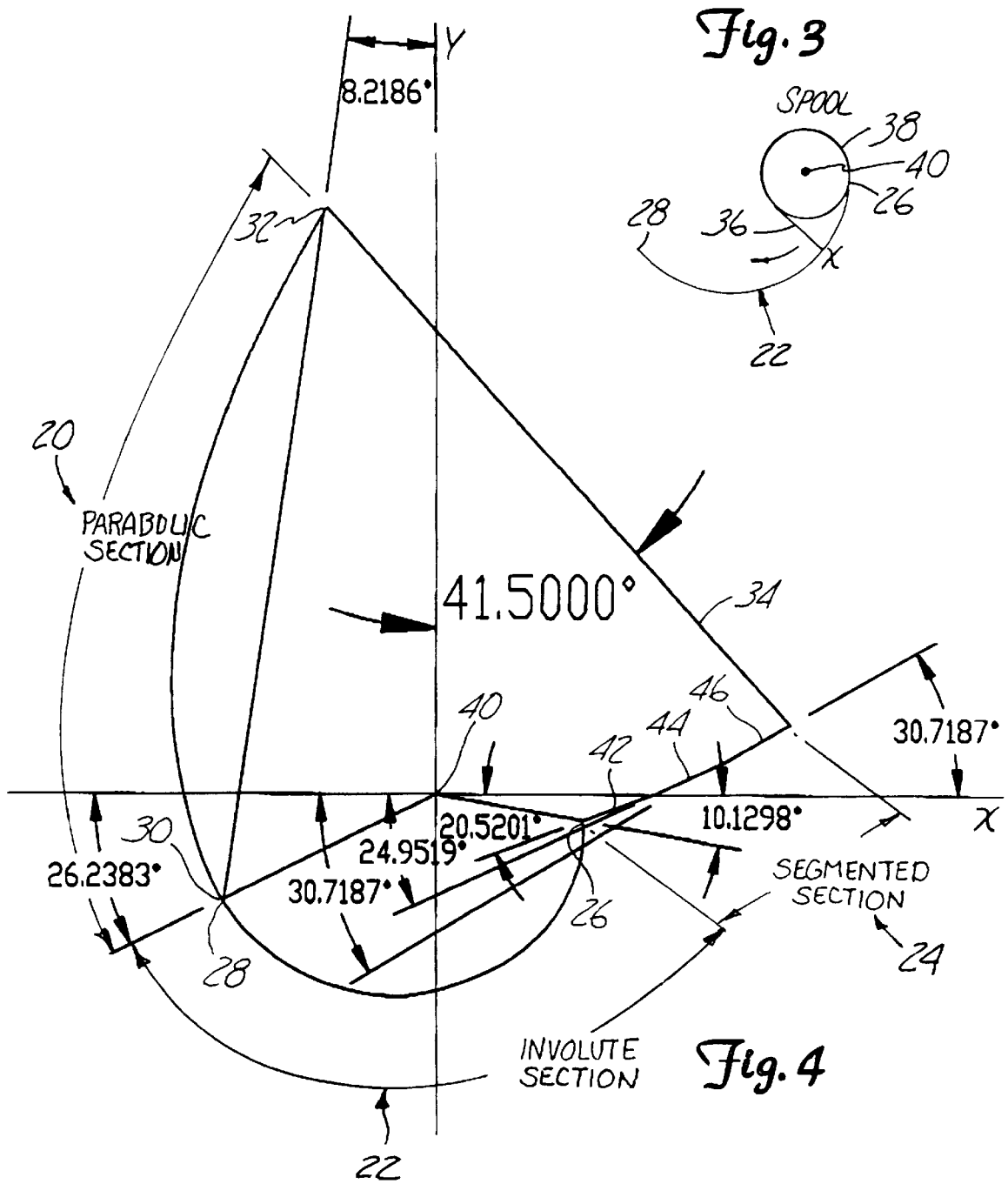

CONCAVE LIGHT REFLECTOR DEVICE

BACKGROUND OF THE INVENTION

The invention pertains to a reflector used with a light source in a light fixture. More particularly, the invention pertains to a concave light reflecting device.

Uniform illumination along a defined horizontal or vertical plane has been the focus of several different configurations for luminaires. It is well known that light rays disperse as they travel away from a luminaire. This requires greater intensity or candle power directed at points in the plane that are further away in distance from the luminaire to maintain uniform illumination across the plane. The inverse square law, with cosign correction, defines the magnitude of illumination along the plane, $E=(I/d^2) \cos \theta$. Satisfying the inverse square law for uniform illumination along the plane requires that the luminaire provide 13.245 times the intensity or candle power at angle $\theta$ of 65° than is provided at nadir.

Various designs and geometric shapes for reflectors have been used to attempt to achieve uniform illumination across a plane. These designs include combining parabolic, elliptic, circular and cylindrical sections as in U.S. Pat. Nos. 3,679,893; 4,027,151; and 4,229,779.

The aim in designing a reflector device is maximizing the amount of light out of the device with minimum glare while maintaining maximum efficiency to avoid decreasing lamp life.

SUMMARY OF THE INVENTION

The concave light reflecting device comprises a parabolic reflecting surface, an involute reflecting surface and a segmented reflecting surface. The involute section includes a first end, a second end and a focal point which is located within the concave portion of the device. The involute section is positioned such that the focal point is closer to the first end of the involute section rather than the second end. The parabolic section also has a first end and a second end, such that the parabolic radius of the first end is less than the parabolic radius of the second end. The first end of the parabolic section transitions from the second end of the involute section. The segmented section is connected to the first end of the involute section and extends outward and away from the focal point of the involute section to decrease the glare from the devise.

BRIEF DESCRIPTION OF THE DRAWINGS

FIG. 3 is a diagram illustrating the concept of an involute curve.

FIG. 4 is a side view of the geometric shape defining a preferred embodiment of the invention.

DETAILED DESCRIPTION OF THE PREFERRED EMBODIMENTS

Figure 1:
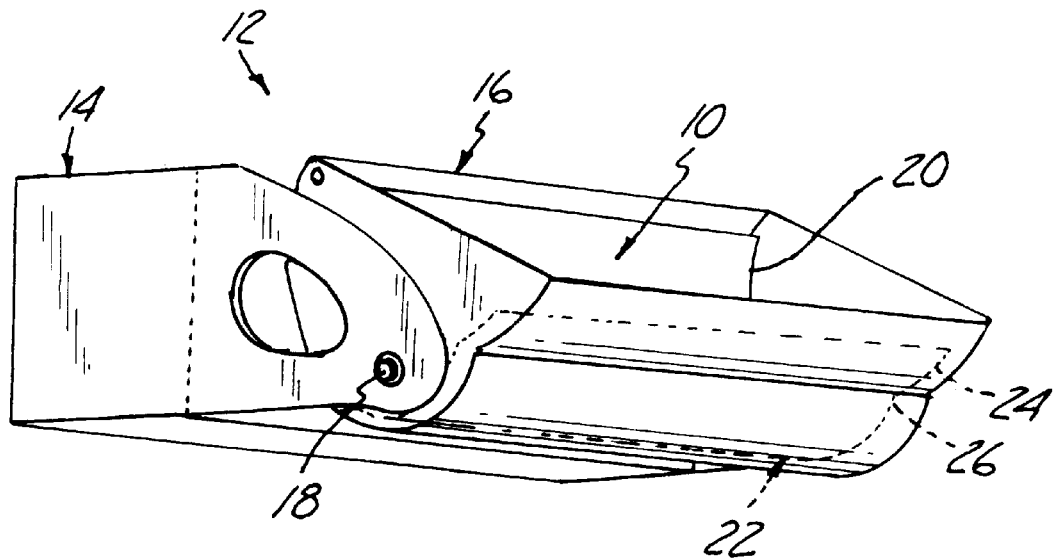
FIG. 1 is a perspective view of a light fixture incorporating a preferred embodiment of a light reflector device.

In FIG. 1, a preferred embodiment of the light reflector device 10 is shown incorporated in a light fixture 12 having a mounting bracket 14 and a decorative housing 16. The decorative housing 16 is secured to the mounting bracket 14 by securing means 18. The light reflector device 10 is secured within the decorative housing 16 to reflect illuminance from a lamp mounted and energized within the decorative housing 16. The decorative housing 16 in which the light reflector device 10 is mounted can be rotated with respect to the mounting bracket 14 about an axis through the securing means 18 to adjust the direction of light provided by the light reflector device 10. The light reflector device 10 further includes a parabolic reflecting surface 20, an involute reflecting surface 22 and a segmented reflecting surface 24.

Figure 2:
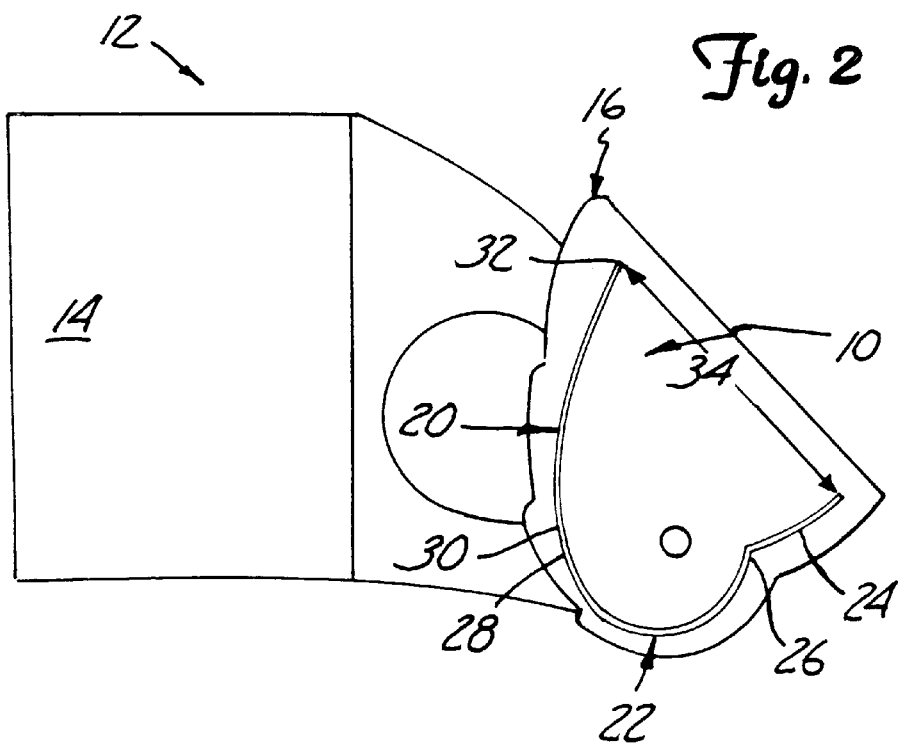
FIG. 2 is a cross-sectional side view of a light fixture incorporating the light reflector device.

FIG. 2 is a cross-sectional view of the light fixture 12 which more clearly shows the geometric configuration of the light reflector device 10. As shown in FIG. 2, the involute section 22 includes a first end 26 and a second end 28, and the parabolic section 20 includes a first end 30 and a second end 32. The first end 30 of the parabolic section 20 transitions from the second end 28 of the involute section 22. The segmented section 24 is connected to the first end 26 of the involute section 22. The segmented section 24 extends outward from the involute section 22. Light rays from the lamp within the device 10 are then directed by the surfaces out of the device 10 through an aperture 34. Aperture 34 is defined by the area between the second end 32 of the parabolic section 20 and the unconnected end of the segmented section 24.

To maximize the amount of light out of the light reflector device 10, the reflecting surfaces are polished aluminum that are bright dipped and anodized by techniques well known in the art to maximize the smoothness and concentration of the surfaces. This minimizes the amount of radiant energy that is absorbed by the reflecting surfaces as a result of reflecting light rays and in turn helps prevent heat build up which decreases the efficiency of the lamp. While the surfaces will absorb some radiant energy from each reflection of a light ray, the total amount of radiant energy that is absorbed can be minimized by limiting the number of reflections for each light ray before they are directed out of the device 10.

Another source of heat build up is from light rays that are reflected by the device 10 back into the lamp. The radiant energy of the light rays reflected back into the lamp generates heat which results in the lamp operating less efficiently and decreases its operating life. To avoid this source of heat build up, the invention places the involute section 22 beneath the lamp. The involute section 22 reflects light rays from beneath or behind the lamp onto the parabolic section 20, rather than back into the lamp.

FIG. 3 is a simple illustration of an involute curve. The involute section 22 can be thought of as a curve that is drawn at the end of a piece of thread 36 as it is unraveled from a spool 38 that is centered at a focal point 40 of the curve. This is illustrated in FIG. 3 at point X on the involute curve with the arrow of rotation showing the direction the thread 36 is unraveled from the spool 38 to create the curve. Moving along the involute curve from the focal point 40, the radial distance from the focal point to the involute curve continually increases. As shown in FIG. 3, a portion of the involute curve from the first end 26 to the second end 28 forms the involute section 22 of the device 10. The increasing radial distance of the involute curve coupled with the fact that light rays reflect off of the reflecting surface at the same angle that they impact the surface causes light rays from the involute section 22 to be directed at the parabolic section 20.

FIG. 4 shows a side view of the light reflector device 10 with angular displacements for the reflecting surfaces. The focal point 40 of the surfaces which make up the involute reflecting surface 22 serves as the origin of the axes to define the light reflecting device 10. The device 10 will be described with the aperture 34 at approximately a 41.5° angle to the vertical axis through nadir. Given the angular displacement of the aperture 34, the device 10 will be described with respect to nadir at 0°.

The parabolic section 20 begins at approximately 192° with the second end 32 and continues to the first end 30 at approximately 296° from nadir. The first end 30 of the parabolic section 20 then transitions to the second end 28 of the involute section 22 at approximately 296° from nadir. The involute section 22 then continues to approximately 80° from nadir where the first end 26 of the involute section 22 is located. The first end 26 of the involute section 22 is then connected to the segmented section 24 at approximately 80° from nadir. The segmented section 24 then extends outward away from the focal point 40 of the involute section 22 from approximately 80° to 100° from nadir. The aperture 34 which provides illuminance from the light reflecting device 10 is located from approximately 100° to 192° from nadir.

In a preferred embodiment, the lamp is centered on the focal point 40 of the involute section 22. Various lamp types can be used within the device 10 such as high intensity discharge (HID), quartz, flourescent and others. However, a lens should be placed across the aperture 34 as a safety precaution if a HID or quartz lamp were used.

The parabolic section 20 is preferably positioned such that the focal point of the parabola differs from the focal point 40 of the involute section 22. The axis of the parabola, from which the parabolic section 20 is taken, is also skewed with respect to the vertical axis y through nadir, such that a line through the first end 30 and the second end 32 preferably intersects the vertical axis opposite nadir at an angle of approximately 8°. Additionally, the parabolic radius of the first end 30 is less than the parabolic radius of the second end 32.

The involute section 22 is preferably positioned such that the radial distance from the focal point 40 to the involute curve increases from the first end 26 to the second end 28. Additionally, the transition between the second end 28 of the involute section 22 and the first end 30 of the parabolic section 20 maintains a continuous, smooth reflecting surface.

The segmented section 24 preferably includes a first flat reflecting surface 42, a second flat reflecting surface 44, and a third flat reflecting surface 46. The first surface 42 is connected between the first end 26 of the involute section 22 and the second surface 44. The first surface 42 intersects the horizontal axis x at approximately a 20° angle. The second surface 44 is connected between the first surface 42 and the third surface 46. The second surface 44 intersects the horizontal axis x at approximately a 25° angle. The third surface 46 is connected to the second surface 44, and intersects the horizontal axis x at approximately a 31° angle.

Figure 5A:
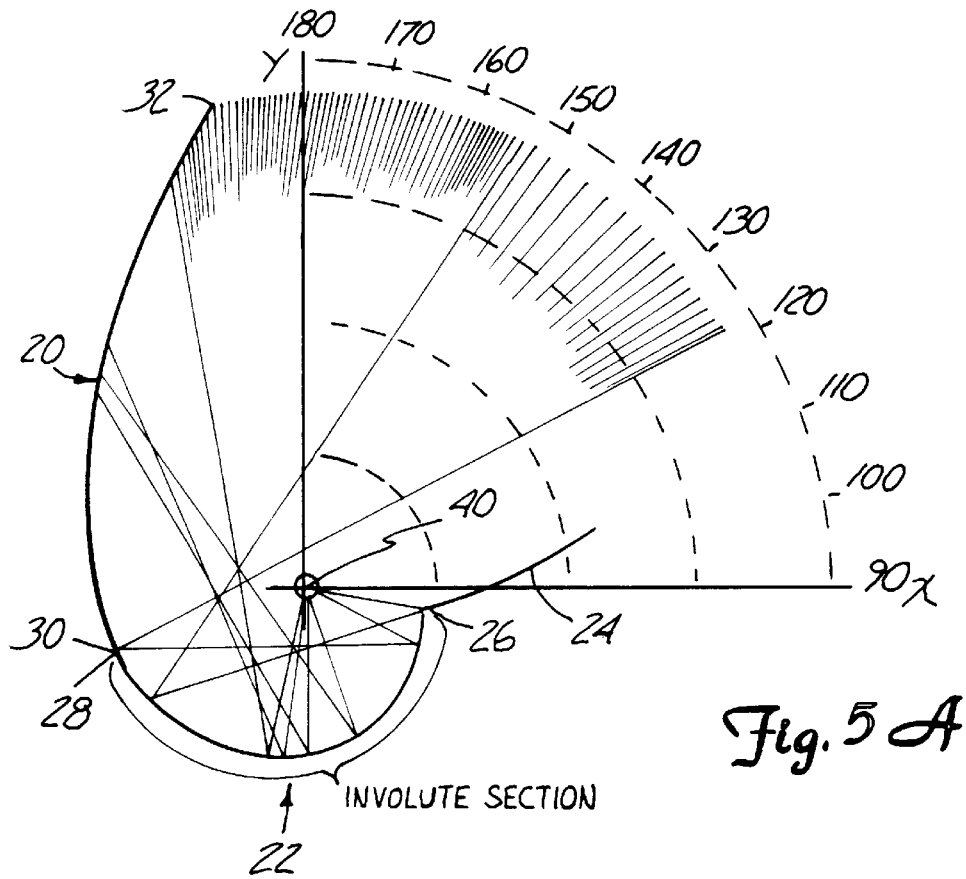
FIG. 5A is a ray trace of the light reflected by an involute reflecting surface of the light reflector device.
Figure 5B:
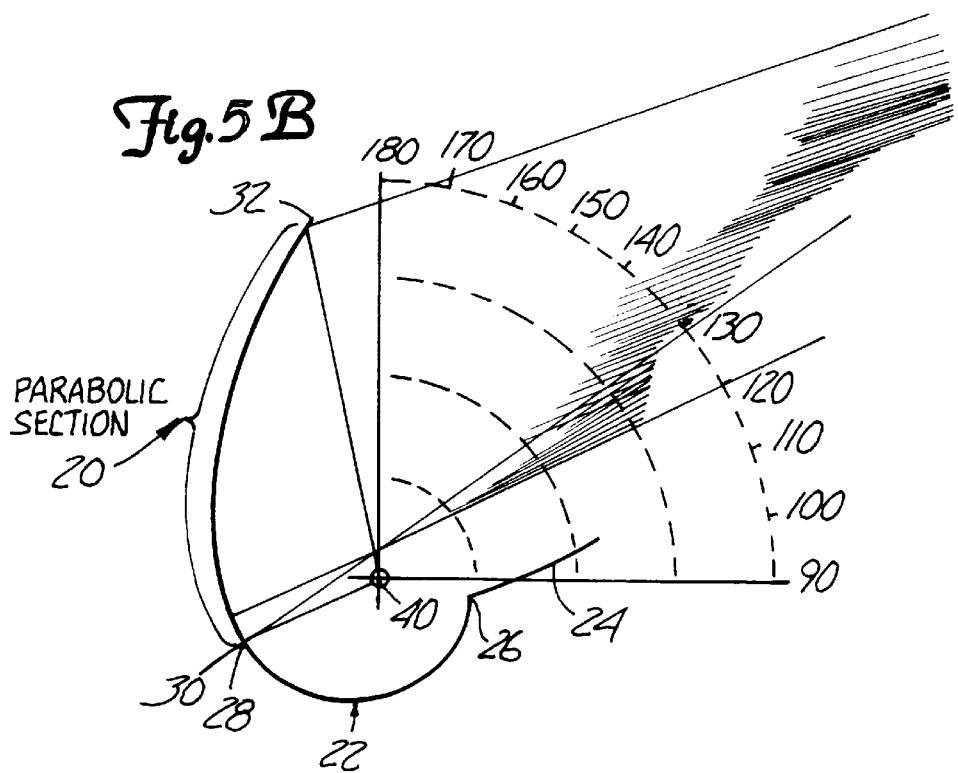
FIG. 5B is a ray trace of the light reflected by a parabolic reflecting surface of the light reflector device.
Figure 5C:
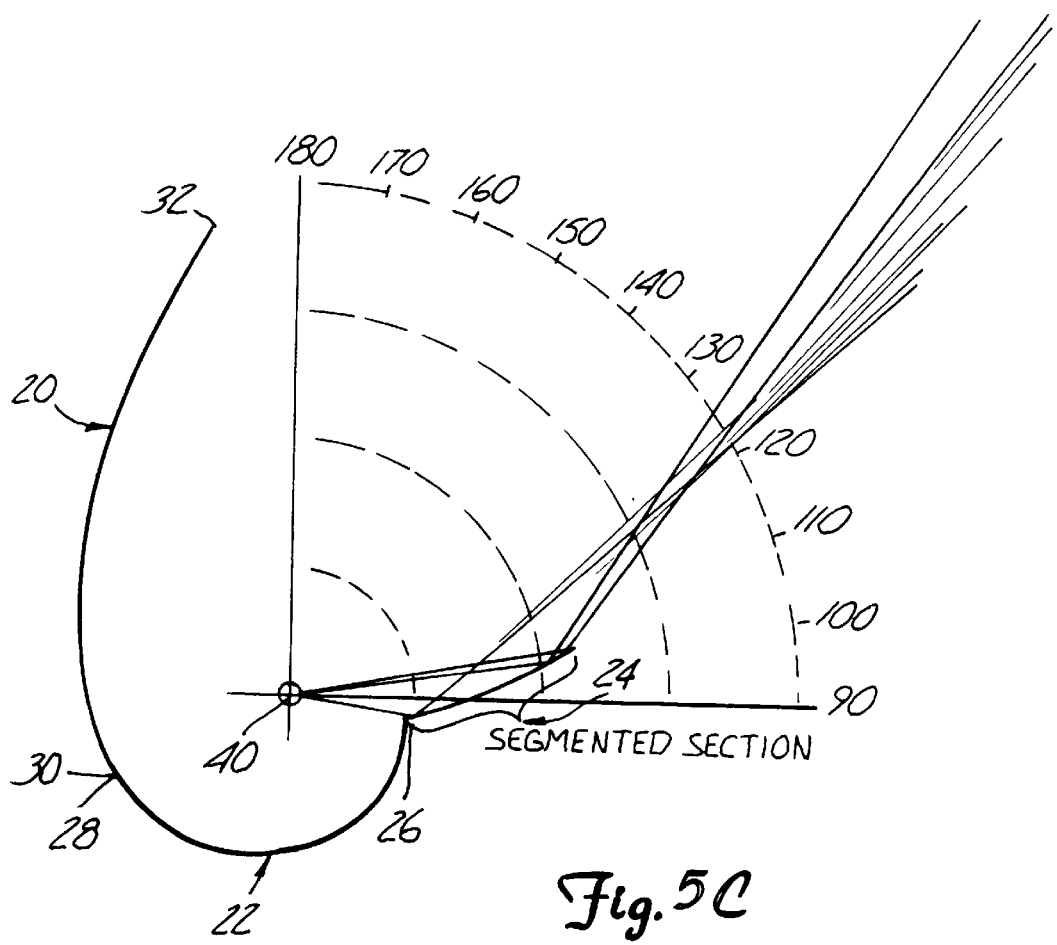
FIG. 5C is a ray trace of the light reflected by the segmented reflecting surface of the light reflector device.

FIGS. 5A–5C are ray traces of representative light rays that reflect off each of the three reflecting surfaces. As illustrated in FIG. 5A, a majority of the light rays reflected by the involute section 22 are directed onto the parabolic section 20. Additionally, the involute section 22 also directs some light rays out of the device primarily from approximately 155° to 192° from nadir. As shown in FIG. 5A, light rays reflected by the involute section 22 are directed away from the lamp which is centered on the focal point 40. This is due to the increasing radial distance of the involute section 22 and the fact that light rays reflect off of the reflecting surface at the same angle that they impact the reflecting surface.

FIG. 5B illustrates the direction that light rays are reflected off of the parabolic section 20. Light rays are directed by the parabolic section 20 out of the light reflector device 10 primarily from approximately 110° to 130° from nadir. The parabolic section 20 reflects the light rays at approximately a 20° angle to the horizontal axis x. The parabolic section 20 provides the highest concentration of light rays from the light reflector device 10 due to its relative size and the light rays that are reflected onto it from the involute section 22.

FIG. 5C illustrates the direction that light rays are reflected by the segmented section 24. Light rays that are reflected by the segmented section 24 are directed primarily between 120° to 130° from nadir. Additionally, the segmented section 24 preferably extends above the horizontal axis x through the focal point 40 to help reduce the glare of the device 10 from direct observation.

Figure 6:
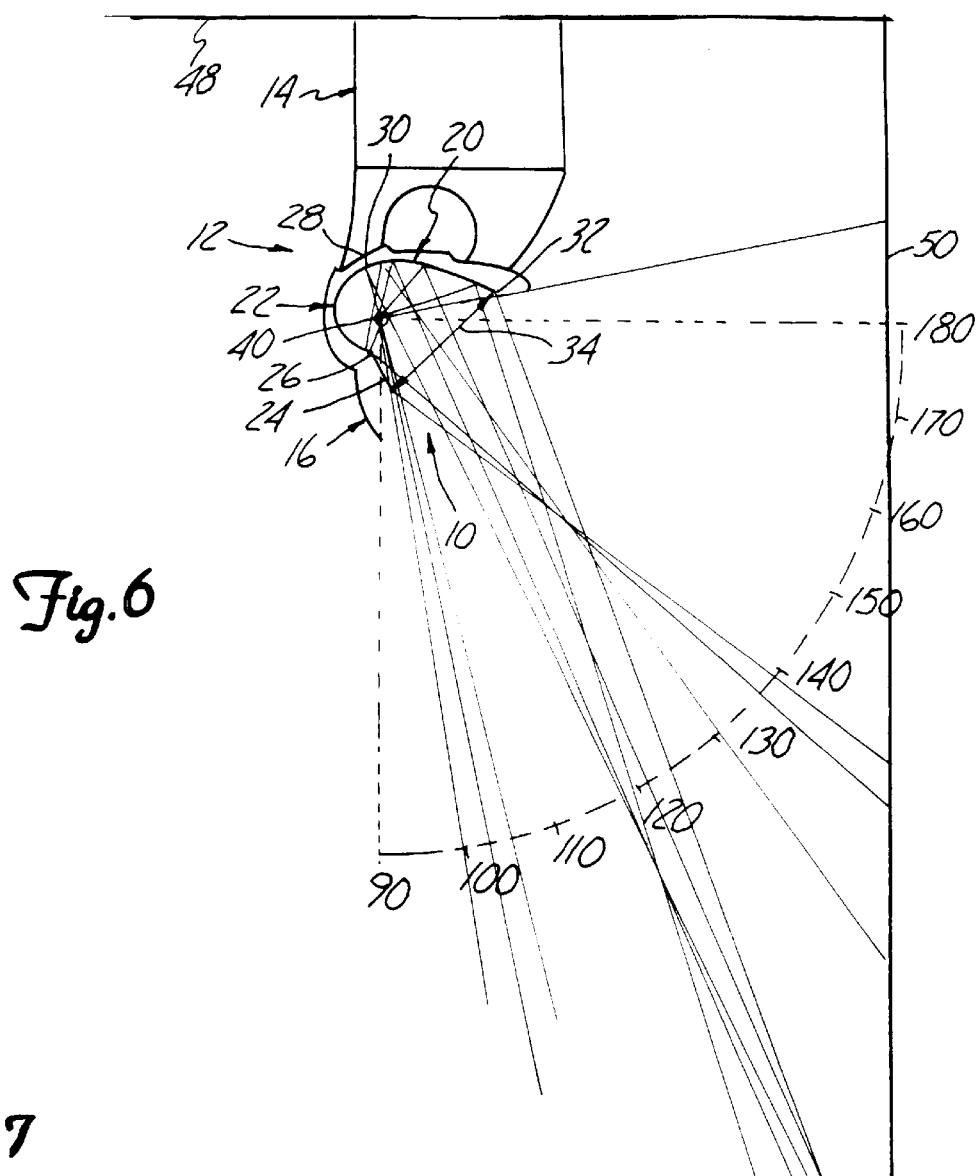
FIG. 6 is a side view of the light reflector device providing illumination across a plane.

FIG. 6 shows a practical application of the light reflector device 10. In FIG. 6, the light reflector device 10 is mounted to a ceiling 48 to provide substantially uniform illumination across a wall 50. The difficulty in providing substantially uniform illumination across a plane, such as wall 50, is that the light rays become more diffuse and provide less illuminance as they travel farther from the light reflector device 10. The light reflector device 10 preferably directs a higher concentration of light rays toward the points on the plane to be illuminated that are farthest from the light reflector device 10 to provide a more uniform distribution of illuminance across the entire plane.

The light reflector device 10 achieves a more uniform distribution of light across a targeted area, such as wall 50, by controlling and limiting where the light rays will be directed. The segmented section 24 and the second end 32, of the parabolic section 20, help cut off or limit the amount of light or illumination provided outside of the targeted area, or wall 50. Illuminance from the lamp is provided by the light reflecting device 10 from approximately 100° to 192° from nadir. In addition to illuminance provided directly to the wall 50 from the lamp centered at the focal point 40, light rays reflected by the light reflecting device 10 also provide illuminance across the wall 50. Each of the three reflecting surfaces provides light primarily to different areas on the plane to be illuminated, or on wall 50.

In FIG. 6, the aperture 34 of the light reflector device 10 is slightly altered from its position of 41.5° with respect to the vertical axis as in FIGS. 4 and 5A–C. In FIG. 6 the aperture 34 is at approximately a 45° angle with the vertical axis through nadir. This will slightly alter the direction of the light rays by the device 10 from that in FIGS. 4 and 5A–C.

The involute section 22 directs light rays primarily onto the parabolic section 20, as well as directing some light rays onto the portion of the wall 50 that is closest to the light reflector device 10. This is referred to as near zone lighting. The light rays reflected by the involute section 22 onto the wall 50 primarily occur between approximately 155° and 192° from nadir.

The segmented section 24 primarily aids in limiting the amount of glare from the lamp within the device 10, but also directs some light rays onto the middle portion of the wall 50. As shown in FIG. 6, light reflected from the segmented section 24 is directed between approximately 130° and 140° from nadir. It should be noted that this range is slightly altered from that shown in FIG. 5C. This is due to the angle that the light rays are reflected off of the segmented section 24.

The parabolic section 20 directs light rays onto that portion of the wall 50 that is farthest from the light reflector device 10. The light rays reflected by the parabolic section 20 are directed between approximately 110° and 130° from nadir.

Figure 7:
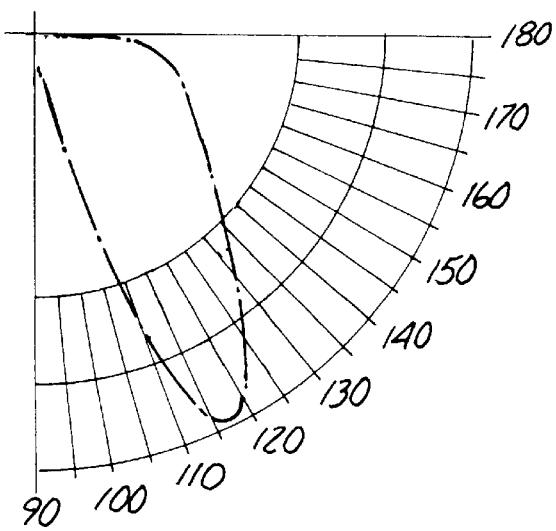
FIG. 7 is a graph showing the relative candle power distribution for the light reflector device.

FIG. 7 is a relative candle power distribution curve. This curve represents the relative candle power, or concentration of illumination, that is provided by the lamp with the light reflector device 10 positioned as in FIG. 6. The relative candle power curve combines the concentration of light rays provided by the lamp and reflected by each of the three reflecting surfaces of the light reflecting device 10.

As previously described, the parabolic section 20 reflects the highest concentration of light rays. Thus the maximum candle power, or highest concentration of illuminance, exists along the reflection path of the parabolic section 20. This achieves the aim of providing substantially uniform illuminance across a plane, such as the wall 50, because the parabolic section 20 directs the highest concentration of light rays to the farthest points that are to be illuminated on the wall 50. Despite the light rays becoming more diffuse as they travel farther from the fixture 12, the highest concentration of light rays provided by the lamp and parabolic section 20, overcomes the effect of diffusion and maintains substantially the same illumination across the wall 50. With the aperture positioned at a 45° degree angle, the highest concentration of illuminance or candle power occurs at approximately 115° from nadir. The sharp cut off provided by the device 10 at approximately 100° and 180° is also illustrated in FIG. 7. The lower concentration of light rays or illuminance near the device 10 at approximately 150° to 180° is also shown.

Although the present invention has been described with reference to preferred embodiments, workers skilled in the art will recognize that changes may be made in form and detail without departing from the spirit and scope of the invention. For instance a general reflecting surface could be used to transition between the parabolic and involute sections. Additionally, respective angles for each of the segmented sections could be adjusted, or the number or shape of the segmented section could be altered. The transition points between the parabolic, the involute and the segmented section could also be adjusted. Similarly, various lenses could be used across the aperture of the devices as well.

By use of the light reflector device 10, the amount of light and efficiency of the lamp is maximized while providing substantially uniform illuminance across a plane with minimum glare.

What is claimed is:

1. A concave light reflecting device, the device comprising:
   a parabolic reflecting surface having a first end and a second end, wherein the parabolic radius of the first end is less than the parabolic radius of the second end;
   an involute reflecting surface having a first end, a second end and a focal point within the concave portion of the device, such that the distance from the focal point to the involute reflecting surface increases from the first end to the second end and wherein the second end of the involute reflecting surface transitions to the first end of the parabolic reflecting surface; and
   a segmented reflecting surface connected to the first end of the involute reflecting surface at approximately 80° from nadir, the segmented reflecting surface extending outward from the focal point of the involute section to decrease glare from the device and create an open aperture across the device from approximately 100° to 192° from nadir to emit light from the device.

2. The device of claim 1, wherein the segmented reflecting surface comprises a series of three flat reflecting surfaces.

3. The device of claim 1, wherein a light source is centered on the focal point of the involute.

4. The device of claim 1, wherein a general reflecting surface is located and transitions between the second end of the involute reflecting surface and the first end of the parabolic reflecting surface.

5. The device of claim 1, wherein the maximum candle power from the device is approximately 110° from nadir when plane across an aperture of the device is at an angle of approximately 41° to nadir.

6. A concave light reflecting device to maximize illuminance and efficiency of a light source, the device comprising:
   a parabolic section which is located on a horizontal and a vertical axis, wherein nadir is at 0°, from approximately 192° to 296°, such that the parabolic radius is shorter at approximately 296° than at 192°;
   an involute section having a focal point at the origin of the axes, wherein the involute section is located from approximately 296° to 80°, such that the involute radius is shorter at approximately 80° than at 296°; and
   a segmented section which extends away from the origin, wherein the segmented section is located from approximately 80° to 100°, such that a line across an aperture of the device from the parabolic section at 192° to the segmented section at 100° forms approximately a 41° angle with the vertical axis through nadir.

7. The device of claim 6, wherein the segmented section comprises three flat reflecting surfaces at different angles with respect to the horizontal axis.

8. The device of claim 6, wherein the maximum candle power of the light source is directed at approximately a 110° angle from nadir.

9. The device of claim 6, wherein the light source is centered on the focal point.

10. A concave light reflecting device, the device comprising:
    a parabolic reflecting surface having a first end and a second end, wherein the parabolic radius of the first end is less than the parabolic radius of the second end;
    an involute reflecting surface having a first end, a second end and a focal point within the concave portion of the device, such that the distance from the focal point to the involute reflecting surface increases from the first end to the second end and wherein the second end of the involute reflecting surface transitions to the first end of the parabolic reflecting surface; and
    a segmented reflecting surface connected to the first end of the involute reflecting surface which extends outward from the focal point of the involute section for decreasing glare from the device, such that the maximum candle power from the device is approximately 110° from nadir when a plane across an aperture of the device is at an angle of approximately 41° to nadir.

11. The device of claim 10, wherein the segmented reflecting surface comprises a series of three flat reflecting surfaces.

12. The device of claim 10, wherein a light source is centered on the focal point of the involute.

13. The device of claim 10, wherein a general reflecting surface is located and transitions between the second end of the involute reflecting surface and the first end of the parabolic reflecting surface.

* * * * *

UNITED STATES PATENT AND TRADEMARK OFFICE
CERTIFICATE OF CORRECTION

PATENT NO. : 5,971,571
DATED : OCTOBER 26, 1999
INVENTOR(S) : FLOYD H. ROSE

It is certified that error appears in the above-identified patent and that said Letters Patent is hereby corrected as shown below:

Col. 6, line 18, delete "when plane", insert --when a plane--

Signed and Sealed this

Twenty-third Day of May, 2000

Attest:

Attesting Officer

Q. TODD DICKINSON
Director of Patents and Trademarks